US012288322B2

(12) United States Patent
Wassmer et al.

(10) Patent No.: US 12,288,322 B2
(45) Date of Patent: Apr. 29, 2025

(54) METHOD FOR QUALITY TESTING OF BRUSHES, IN PARTICULAR TOOTHBRUSHES, TESTING DEVICE AND BRUSH MAKING MACHINE

(71) Applicant: Zahoransky AG, Todtnua (DE)

(72) Inventors: Felix Wassmer, Schopfheim (DE); Urs Schmid, Todtnau (DE)

(73) Assignee: Zahoransky AG, Todtnau (DE)

( * ) Notice: Subject to any disclaimer, the term of this patent is extended or adjusted under 35 U.S.C. 154(b) by 417 days.

(21) Appl. No.: 17/738,065

(22) Filed: May 6, 2022

(65) Prior Publication Data

US 2022/0358632 A1 Nov. 10, 2022

(30) Foreign Application Priority Data

May 7, 2021 (EP) ..................................... 21172699

(51) Int. Cl.
*G06T 7/00* (2017.01)
*G06T 7/90* (2017.01)
*G06V 10/764* (2022.01)

(52) U.S. Cl.
CPC ............... *G06T 7/001* (2013.01); *G06T 7/90* (2017.01); *G06T 7/97* (2017.01); *G06V 10/764* (2022.01); *G06T 2207/20081* (2013.01)

(58) Field of Classification Search
CPC .. G06T 7/001; G06T 7/90; G06T 7/97; G06T 2207/20081; G06T 7/0006; G06T 7/60; G06T 2207/10004; G06T 2207/20084; G06T 2207/30108; G06V 10/764; G06V 10/82; A46D 3/08; A46D 1/003; A46B 2200/1066; G01N 21/8851; G01N 2021/8887

See application file for complete search history.

(56) References Cited

U.S. PATENT DOCUMENTS

| 2001/0016061 A1* | 8/2001 | Shimoda ................. H01L 22/20 |
| | | 382/149 |
| 2020/0160505 A1* | 5/2020 | Kohler ................ G06F 18/2431 |
| 2021/0182996 A1* | 6/2021 | Cella ..................... G06Q 10/083 |
| 2022/0222807 A1* | 7/2022 | Tae ........................ G06T 7/0004 |
| 2022/0245402 A1* | 8/2022 | Tae ........................ G06N 20/00 |
| 2022/0245574 A1* | 8/2022 | Cella ..................... G06Q 10/087 |

FOREIGN PATENT DOCUMENTS

| DE | 8414080 | 3/1988 |
| EP | 2210521 | 7/2010 |
| EP | 3150082 | 4/2017 |
| WO | 0010425 | 3/2000 |
| WO | WO-2019107614 A1 * | 6/2019 ........... G06K 9/3233 |

* cited by examiner

*Primary Examiner* — Roy M Punnoose
(74) *Attorney, Agent, or Firm* — Volpe Koenig

(57) ABSTRACT

A method for quality testing of brushes (2) is provided, in which method a trained, AI-based, classifier (4) is used. After corresponding training using a training data set which shows images of defective brushes, the classifier (4) is configured to classify brushes (2) to be checked as defective brushes based on images of the brushes (2).

19 Claims, 3 Drawing Sheets

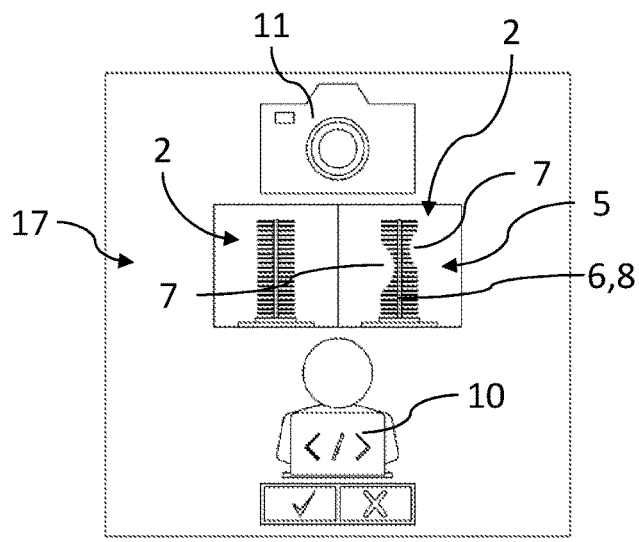
Fig. 2
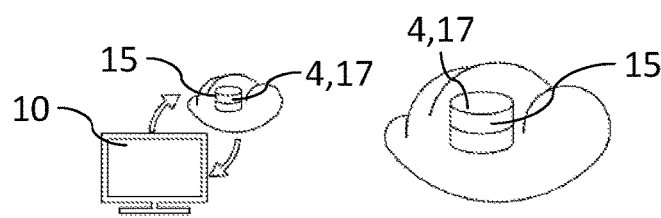
Fig. 3
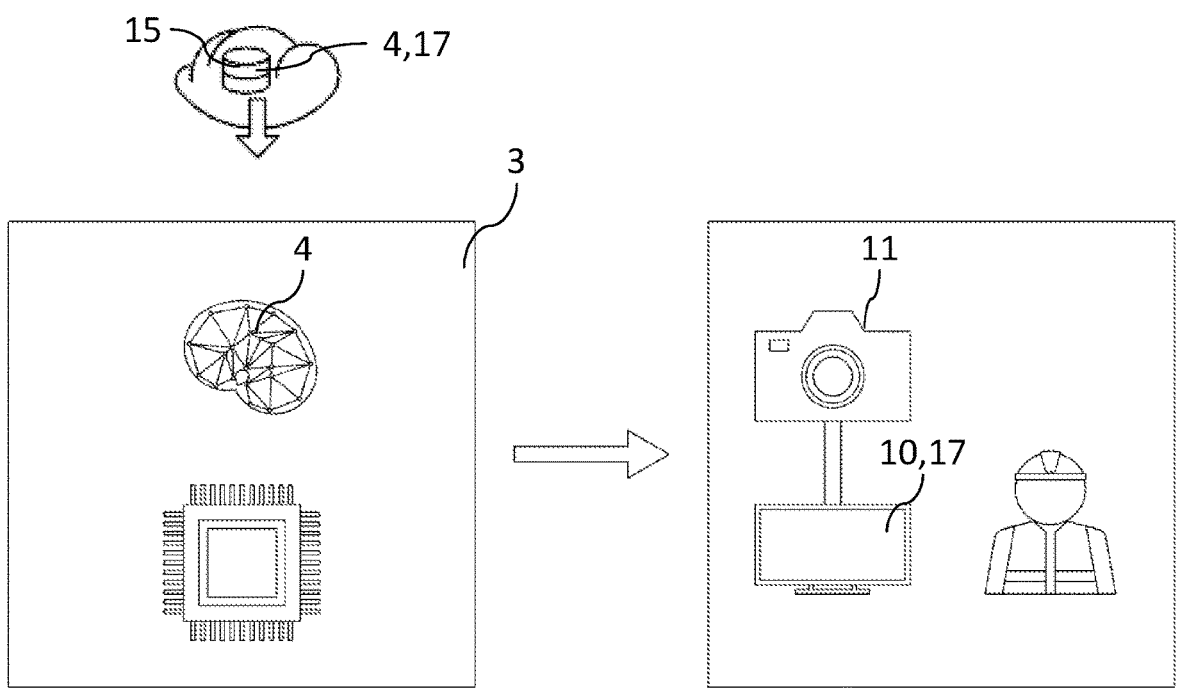
Fig. 4                                   Fig. 5

METHOD FOR QUALITY TESTING OF BRUSHES, IN PARTICULAR TOOTHBRUSHES, TESTING DEVICE AND BRUSH MAKING MACHINE

TECHNICAL FIELD

The invention relates to a method for quality testing of brushes, in particular toothbrushes and/or round brushes, and to a brush making machine.

BACKGROUND

The demands on the quality of brushes have continued to increase in recent years. In addition, the production of brushes is subjected to a considerable cost pressure. Therefore, the need to continue improving the methods for producing brushes is increasing. An essential aspect in this case is reliable quality checking of the brushes that is as simple as possible.

SUMMARY

It is therefore the object of the invention to provide a method for quality testing of brushes, a checking apparatus and a brush making machine of the type mentioned at the outset which promote economic production of brushes.

In order to achieve this object, first of all a method for quality testing of brushes, in particular toothbrushes and/or round brushes, is provided, the method comprising one or more of the means and features disclosed herein directed to such a method. In order to achieve the object, in particular a method for quality testing of brushes, in particular toothbrushes and/or round brushes, using a classifier is thus provided, the classifier being configured to classify brushes to be checked as defective brushes based on images of the brushes to be checked, wherein the classifier is trained using a training data set comprising images of defective brushes before carrying out the quality check.

The classifier may be a classifier of a checking apparatus explained in more detail further below, which for its part may be part of a brush making machine likewise explained in more detail further below.

Using a trained classifier provides an automated method for quality testing of brushes which makes it possible to check the quality of brushes particularly effectively and economically.

As a result of the fact that the classifier is trained using a training data set comprising images of defective brushes, it is particularly easily possible to train the classifier for particular brush models and to identify defects that arise specifically with these brush models. As a result, the method is relatively flexible and, after appropriate training of the classifier, can be used without a great deal of outlay even when a model of the brushes to be produced and to be checked is changed.

In one embodiment of the method, provision is made for the images of the training data set to show brushes which have at least one defect in a set of bristles and/or on a brush head and/or on a brush body and/or on a brush handle.

The training data set comprising images of defective brushes can comprise images which show at least one defect type that often arises in a particular brush type. In this way, it is possible to train the classifier in a targeted manner to identify defects for quality testing of particular brushes. In this case, in particular such defects that also where necessary take into account the type of brush making machine used in the production of the brushes can be shown in the images of the training data set. Particular brush making machines may tend to produce particular error patterns under certain conditions, in particular under certain environmental conditions and/or other external factors.

Taking into account the type of brush making machine, the environmental conditions and/or other external factors, a training data set comprising images of defective brushes can be generated in this way in a targeted manner and can be used for training the classifier in order to obtain the best possible trained classifier which can carry out the quality check particularly reliably.

The quality of the classifier for carrying out the quality check can be increased still further if the training data set comprises images of intact brushes. The classifier can learn what constitutes a defective brush and what constitutes an intact brush particularly quickly and reliably using a training data set configured in this manner comprising images of both defective and intact brushes. This can significantly improve the result of the classification of brushes to be checked as intact or as defective brushes.

The classifier which is used in the implementation of the method can be configured to classify brushes to be checked as intact brushes and/or as defective brushes based on images of the brushes.

In one embodiment of the method, provision can be made for features which can represent defects in the set of bristles and/or on the brush head and/or on the brush body and/or on the brush handle to be extracted from the training data set. These extracted features can then be used for training the classifier, in particular when the classifier is an AI-based classifier which can be configured for example for machine learning or else for deep learning.

Features which represent intact brushes can also be extracted from the training data set. This can also promote training of the classifier by way of which the classifier is ultimately enabled to classify brushes to be checked as defective or as intact brushes.

In one embodiment of the method, provision is made for a defect in the set of bristles to be a shape of the set of bristles that deviates from a target shape, a bristle density that deviates from a target bristle density, a bristle alignment that deviates from a target alignment of bristles, preferably in relation to a brush head and/or a brush body and/or a brush handle and/or brush shaft, and/or a bristle length that deviates from a target length and/or a color distribution that deviates from a target color distribution in the set of bristles and/or a coloration that deviates from a target coloration in the set of bristles.

A defect on the brush head and/or on the brush body and/or on the brush handle and/or on the brush shaft may be an actual geometry that deviates from a target geometry of the brush head and/or the brush body and/or the brush handle and/or the brush shaft. The actual geometry of a defective brush constituting a defect whose image can be contained in the training data set may be for example a dent, depression, instance of damage and/or a surface quality that deviates from a target surface quality and/or a deformation and/or a bend, and/or a coloring that deviates from a target coloring. For example, a defined surface roughness can be specified as surface quality, the surface roughness occurring based for example on a reflection or absorption behavior of the surface upon irradiation of the surface of the brush, in particular the brush head and/or the brush body and/or the brush handle and/or the brush shaft."

The training data set can thus comprise images of brushes which each show at least one of the aforementioned defects on a brush.

In one embodiment of the method, provision is made for at least one image of a brush to be checked to be captured and for the brush to be classified by the classifier as a defective or intact brush, in particular on the basis of features of the brush extracted from the image.

A result of the classification carried out by the classifier can be output as test result. This can be done for example by an output unit of a checking apparatus. The checking apparatus may be for example a checking apparatus of a brush making machine.

The images of the training data set can show brushes in at least one defined view. The at least one defined view may be for example a side view.

In order to be able to carry out reliable checking using the trained classifier, it may be expedient if images of the brushes to be checked are captured in the same view as the view in which the images of the training data set show the brushes.

In order to further improve the trained classifier, it may be expedient to play a confirmation and/or a correction of the classification carried out by the classifier back to the classifier.

In one embodiment of the method, the correction or confirmation of the classification carried out by the classifier can be played back in particular a human-machine interface, for example on a computer. In another embodiment of the method, provision can be made for the additional training described above, which may also be referred to as feedback training, to be carried out by a trained feedback classifier.

In this case, the first defined classifier thus forms a classifier cascade together with the feedback classifier.

For example, the feedback classifier may have been trained using a training data set comprising images of defective and/or intact brushes which have previously been classified appropriately using the trained classifier as intact or defective brushes.

The feedback classifier can thus be trained using a consolidated training data set comprising images of brushes classified appropriately by the first classifier.

In this way, it is possible to achieve an improvement in the classifier and thus an improvement in the test result by the cascaded classifier arrangement consisting of the first trained classifier and the trained feedback classifier.

An AI-based classifier, in particular a classifier configured for machine learning and/or deep learning, can be used as classifier. This also applies to the previously mentioned feedback classifier, which can be used for the confirmation and/or correction of the classification carried out by the classifier.

In one particular embodiment of the method, provision is made for defective brushes to be produced deliberately in order to produce the images of defective brushes of the training data set. In this case, brushes which are defective with respect to at least one feature can be produced. The deliberate production of defective brushes is possible for example by using a brush making machine which has been deliberately incorrectly adjusted.

Images of these brushes which are then defective with respect to at least one feature are captured using a camera and said images are stored in the training data set. In this way, it is possible to generate a plurality of images of defective brushes and to store them in the training data set for training the classifier. In addition, it is thus possible to generate specific defects on brushes for a particular brush making machine type and to depict these defects in images which can then be used for the training data set of the classifier.

In one embodiment of the method, images of each brush are captured from at least two different viewing angles. In this case, the brushes produced deliberately with defects using a brush making machine which has been incorrectly adjusted can be rotated using a rotary apparatus when the images are captured or in order to capture the images, for example a brush making machine explained in more detail further below. This also promotes particularly efficient generation of the training data set.

In order to incorrectly adjust the brush making machine in the method step before the training data set is generated, it is possible to adjust the brush making machine in individual or several operating parameters so that defective brushes are produced deliberately. For example, it is possible to use bristle filaments with an actual length that deviates from a target length when producing the brushes. It is also possible to adjust a cutting apparatus for shortening bristles on a brush head of produced brushes so that the bristles are cut too short, that is to say the bristles have an actual length that deviates from a target length in the set of bristles of the finished brush.

It is also conceivable for example to operate a handling apparatus and/or a clamping apparatus of the brush making machine with an operating pressure that deviates from a target operating pressure and thereby to generate deliberately instances of damage on the brushes which then show up as defects in the captured images of the training data set.

A person skilled in the art can deduce further starting points for incorrectly adjusting a brush making machine from their subject knowledge in the art.

In order to achieve the object, a checking apparatus comprising means by way of which the checking apparatus is configured to carry out the method for quality testing of brushes is also provided.

In one embodiment of the checking apparatus, provision is made for the checking apparatus to comprise at least one classifier and/or a controller and/or at least one camera and/or at least one output unit and/or at least one rotary apparatus for rotating the brushes during the capture of images of the brushes and/or at least one database.

The database can be connected for example to the controller and/or to the classifier at least temporarily and/or contain a training data set and/or a or the classifier.

In order to achieve the object, a brush making machine comprising a checking apparatus as claimed in one of the claims directed to a checking apparatus is finally also provided.

In order to achieve the object, a production network comprising at least two brush making machines as with one or more of the features described herein with respect to a brush making machine is also provided. The brush making machines can be connected to one another at least temporarily by a data connection, in particular by at least one preferably cloud-based database.

The brush making machines and the checking apparatuses thereof can obtain training data sets and/or exchange them among one another by the data connection. Furthermore, it is possible to exchange information relating to the previously mentioned feedback training by the data connection between the at least two brush making machines of the production network in order to continuously increase the performance of the classifiers thereof.

Furthermore, it is possible to provide the brush making machines of the production network with at least one trained classifier by the database, it being possible for the brush making machines organized in the production network to resort to said trained classifier in order to carry out the previously explained method for quality testing of brushes.

BRIEF DESCRIPTION OF THE DRAWINGS

Exemplary embodiments of the invention are explained in more detail below based on the drawing. The invention is not restricted to the exemplary embodiments shown in the figures; further exemplary embodiments result through combining the features of individual or several claims with one another and/or by combining individual or several features of the exemplary embodiments.

In the figures:

FIG. 2 shows a schematic representation to illustrate the generation of a training data set for training the classifier, FIG. 3 shows a schematic representation to illustrate the fact that for example the training data set and/or a classifier trained thereby can be provided in a cloud-based database, FIG. 4 shows a schematic representation to illustrate the training of the classifier using a training data set obtained from a cloud-based database, FIG. 5 shows a schematic representation to illustrate feedback training of the trained classifier by confirming and/or correcting the classifications carried out by the classifier by way of a trained operator at a human-machine interface.

DETAILED DESCRIPTION

Figure 1:
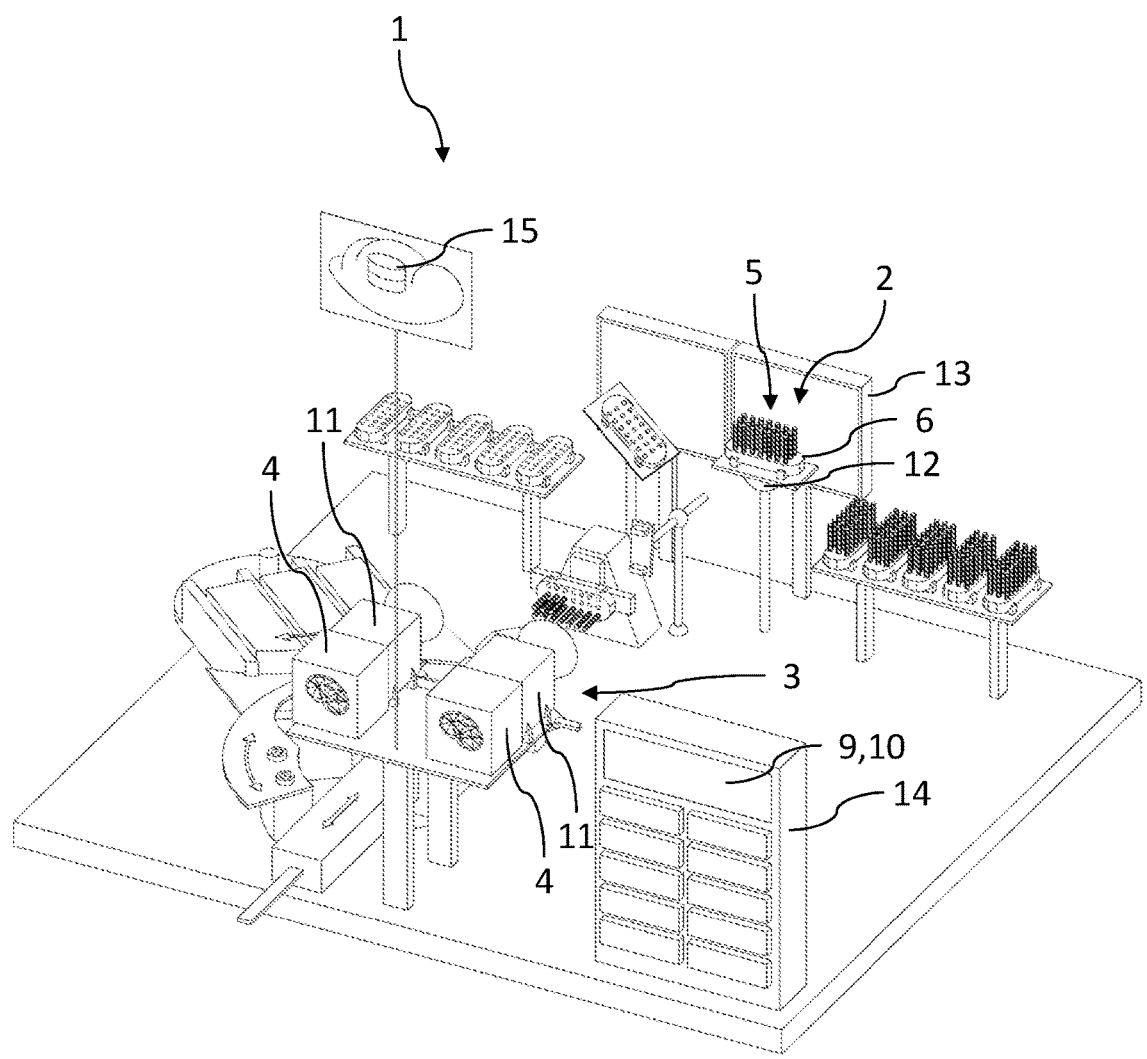
FIG. 1 shows a perspective view of a brush making machine comprising a checking apparatus which is configured to carry out the method according to the invention.

FIG. 1 shows a brush making machine for producing brushes 2, denoted overall by 1. The brush making machine 1 comprises a checking apparatus 3 to carry out a quality check on the brushes 2 produced.

The checking apparatus 3 is provided with means by way of which it is configured to carry out the method for quality testing of brushes 2 described below.

The core of the method for quality testing of the brushes 2 is the use of a classifier 4 of the checking apparatus 3. The classifier 4 is configured to classify brushes 2 to be checked as defective brushes based on images of the brushes 2 to be checked.

In order to enable the classifier 4 to carry out this quality check, the classifier 4 is trained before carrying out the quality check using a training data set 17 comprising images of defective brushes 2.

The images of the training data set 17 show brushes 2 which show at least one defect in the set of bristles 5 or else at least one defect on a brush head and/or on a brush body 6 and/or on a brush handle and/or on a brush shaft of the brushes 2.

FIG. 2 shows two images of brushes 2 which are designed as round brushes. In this case, the right-hand image of the two images in FIG. 2 shows a brush 2 which has a defect 7 in the set of bristles 5.

The brush bodies 6 of the brushes 2 illustrated in FIG. 2 consist of a shaft which is formed from sections of wire twisted together with one another. The shaft also forms at the same time a brush handle of this type of brush 2.

The training data set 17 which is illustrated in FIG. 2 by the two images of brushes 2 also comprises images of intact brushes 2 in addition to images of defective brushes 2. The left-hand image of the two images in FIG. 2 shows an intact brush 2.

After training using the training data set 17, the classifier 4 is configured to classify brushes 2 to be checked as intact brushes or as defective brushes based on images of the brushes 2.

In order to train the classifier 4, features which represent defects 7 of brushes 2 for example in the set of bristles, on the brush head, on the brush body and/or on the brush handle and/or on the brush shaft can be extracted from the training data set 17. If the training data set 17 also contains images of intact brushes 2, as in the exemplary embodiment illustrated in the figures, features which represent intact brushes 2 can also be extracted from the training data set 17 for training the classifier 4.

FIG. 2 illustrates that a defect 7 in the set of bristles 5 of a brush 2 may be for example a shape of the set of bristles 5 that deviates from a target shape.

The deviation from the target shape of the set of bristles 5 can be based for example in a bristle density that deviates from a target bristle density, in a bristle alignment that deviates from a target alignment of bristles and/or in a bristle length that deviates from a target length.

Other deviations from a target design of the set of bristles can also constitute defects 7 which can be identified from images of the training data set 17 for training the classifier 4. It is thus also possible for example to show a deviation from a target coloration and/or from a target color distribution as defects 7 in the images of defective brushes 2 in the training data set 17.

A defect 7 on the brush head, on the brush body 6 and/or on the brush handle and/or on the brush shaft may be for example an actual geometry that deviates from a target geometry of the brush head, the brush body and/or the brush handle. As a defect of this type, it is imaginable for example that a dent, depression, instance of damage and/or surface quality that deviates from a target surface quality and/or a deformation and/or a bend and/or a coloring that deviates from a target coloring is present in the parts or regions of the brushes 2 already mentioned.

For the most comprehensive training of the classifier 4 possible, it may be advantageous if as many of the previously mentioned defects 7 as possible can be identified in as many different designs as possible in the images of the training data set which display defective brushes 2.

In the round brushes illustrated highly schematically in FIG. 2, a possible defect 7 may also exist for example in an instance of damage to the brush shaft 8 of the respective round brush. A defect in or on the brush shaft 8 may be for example a bend and/or a deviation from a target dimension of the brush shaft 8, for example a deviation from a target diameter and/or a target length.

When the method is carried out, at least one image of a brush 2 to be checked is first captured and the brush 2 is classified by the previously trained classifier 4 as a defective or intact brush 2, for example on the basis of features of the brush 2 extracted from the image.

A result of the classification carried out by the classifier 4 is then output as test result. This is done by an output unit 9 of the checking apparatus 3 of the brush making machine 1. For this purpose, the output unit 9 can output a perceivable signal, for example an acoustic and/or optical signal.

The images of the training data set 17 can show brushes 2 in at least one defined view, for example in a side view.

The images of the brushes 2 to be checked are then captured during the actual quality check in the same view in which the images of the training data set 17 also display the brushes 2.

FIG. 5 represents what is known as feedback training of the already trained classifier 4. During this feedback training, a confirmation or a correction of the classifications of brushes 2 as defective or intact brushes already carried out by the classifier 4 is played back to the classifier 4 in order to further train the classifier 4 and to thus improve the capabilities thereof for correctly classifying brushes 2 to be checked.

In the exemplary embodiment shown in FIG. 5, this is done by a human-machine interface 10, in this case by a computer.

It is also possible to use a trained feedback classifier, as has already been explained in more detail in the general part of the description.

The classifier 4 and also a feedback classifier possibly used for feedback training is in each case an AI-based classifier which is configured for machine learning and/or for deep learning.

In order to generate the images of defective brushes 2 of the training data set, defective brushes 2 are deliberately produced. This is done using a brush making machine 1 which has been incorrectly adjusted. Images of these brushes 2 which may then have various defects 7 on account of the incorrect adjustment of the brush making machine 1 are then captured using a camera 11 of the checking apparatus 3 and stored in the training data set 17.

In this case, images of each brush 2 can be captured from at least two different viewing angles.

For this purpose, the brush making machine 1 according to FIG. 1 has a rotary apparatus 12 using which the brushes 2 can be rotated when the images are captured. The rotary apparatus 12 of the brush making machine 1 is in this case arranged in such a way that the brushes 2 held on the rotary apparatus 12 are illuminated from behind using an illumination unit 13. The rotary apparatus 12 is thus arranged between the illumination unit 13 and the at least one camera 11 of the brush making machine 1.

The checking apparatus 3 also comprises a controller 14 using which for example the rotary apparatus 12 and the camera 11 can be controlled.

Depending on the result of the classification carried out by the classifier 4, which at the same time constitutes the result of the quality check, the controller 14 of the checking apparatus 3 can also control the output unit 9.

The checking apparatus 3 is also connected at least temporarily to a database 15 by a data connection, a brush-type-specific training data set and/or an AI model for the classifier 4 being able to be downloaded from the database, for example.

Furthermore, it is possible to store a training data set 17 generated using the brush making machine 1 and the checking apparatus 3 thereof in the database 15 and to provide same to other brush making machines 1 and the checking apparatuses 3 thereof for training the classifiers 4 thereof. Furthermore, it is possible in this way also to provide brush making machines 1 and the checking apparatuses 3 thereof with classifiers 4 which have already been trained.

Figure 6:
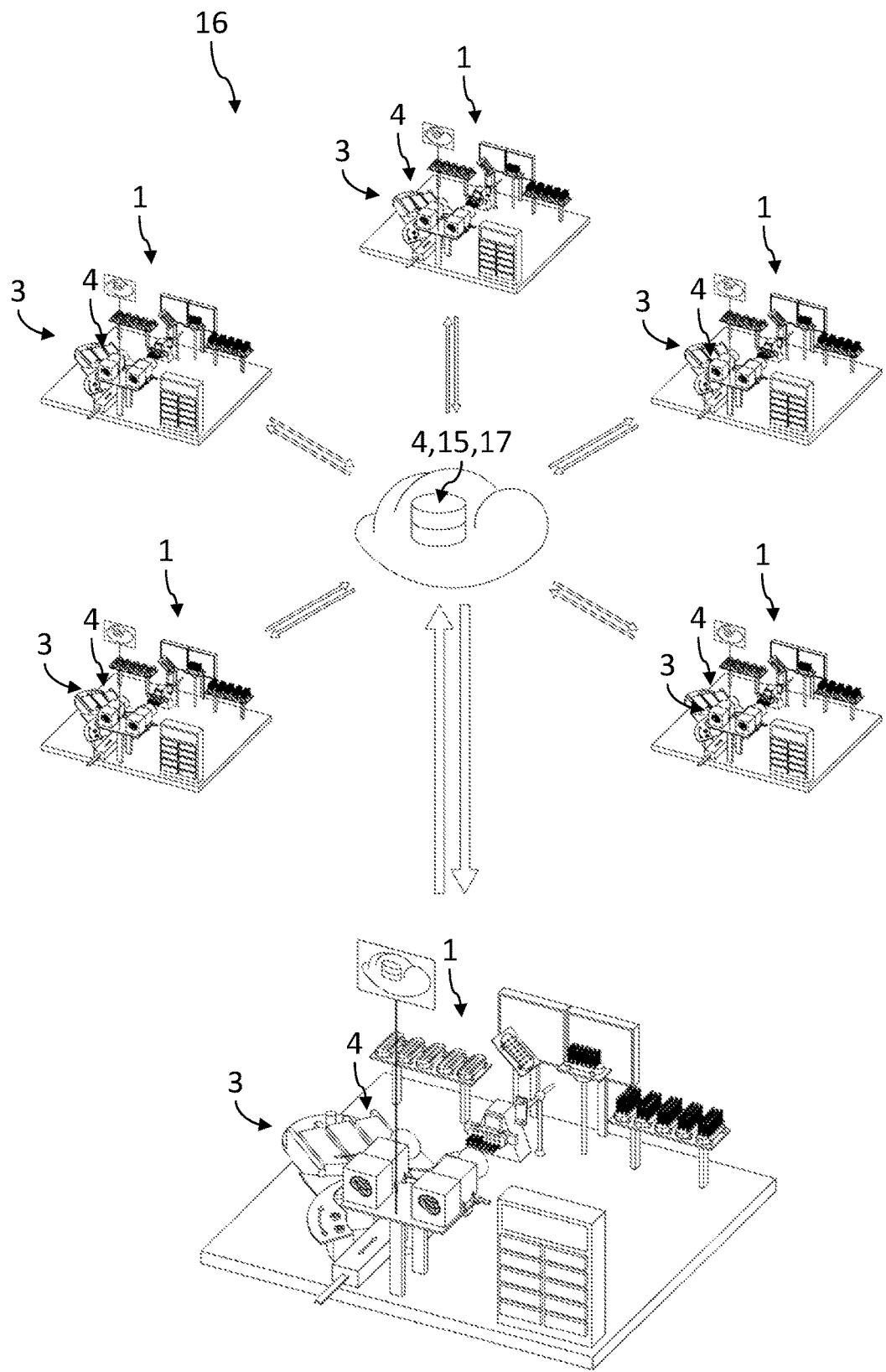
FIG. 6 shows a representation to illustrate a production network composed of a total of six brush making machines connected to one another by a cloud-based database and corresponding data connections.

According to FIG. 6, several brush making machines 1 can be organized in one production network 16.

The production network 16 shown in FIG. 6 comprises a total of six brush making machines 1 which each have a checking apparatus 3. The brush making machines 1 are connected to one another at least temporarily by a data connection and a cloud-based database 15.

The brush making machines 1 and the checking apparatuses 3 thereof can exchange training data sets 17 and/or classifiers 4 which have already been trained by the cloud-based database 15 or training data sets 17 and/or classifiers 4 specifically trained for specific brush types can be provided to the brush making machines 1 and the checking apparatuses 3 thereof.

The feedback classifier already mentioned previously can also be stored in the cloud-based database 15, for example.

The invention deals with improvements in the field of brush production. To this end, among other things, a method for quality testing of brushes 2 is provided, in which method a trained, preferably AT-based, classifier 4 is used. After corresponding training using a training data set which shows images of defective brushes, the classifier 4 is configured to classify brushes 2 to be checked as defective brushes based on images of the brushes 2.

LIST OF REFERENCE SIGNS

1 Brush making machine
2 Brush
3 Checking apparatus
4 Classifier
5 Set of bristles
6 Brush body
7 Defect
8 Brush handle
9 Output unit
10 Human-machine interface, in particular computer
11 Camera
12 Rotary apparatus
13 Illumination unit
14 Controller
15 Database
16 Production network
17 Training data set

The invention claimed is:

1. A method for quality testing of brushes (2) using a classifier (4), the method comprising:
   producing images of defective brushes (2) of a training data set by producing deliberately defective brushes (2) using a brush making machine (1) which has been deliberately incorrectly adjusted,
   capturing images of the defective brushes (2) using a camera (11) and storing said images in the training data set, and
   configuring the classifier (4) to
      classify the brushes (2) to be checked as defective brushes based on the images of the brushes (2) to be checked, and
      training the classifier (4) using the training data set comprising images of defective brushes (2) before carrying out the quality testing.

2. The method as claimed in claim 1, wherein
   the images of defective brushes of the training data set show sample defective brushes (2) which have at least one defect in at least one of a set of bristles (5) on a brush head, on a brush body (6), or on a brush handle.

3. The method as claimed in claim 1, wherein the training data set comprises images of intact ones of the brushes (2).

4. The method as claimed in claim 1, further comprising:
   extracting features which represent defects (7) in at least one of a set of bristles on a brush head, on a brush body, or on a brush handle from the training data set.

5. The method as claimed in claim 1, further comprising:
detecting a defect (7) in a set of bristles (5) based on at least one of
- a shape of the set of bristles (5) that deviates from a target shape,
- a bristle density that deviates from a target bristle density,
- a bristle alignment that deviates from a target alignment of bristles,
- a bristle length that deviates from a target length,
- a coloration that deviates from a target coloration, or
- a color distribution that deviates from a target color distribution in the set of bristles.

6. The method as claimed in claim 1, further comprising:
detecting a defect on at least one of a brush head, the brush body (6), or a brush handle based on an actual geometry that deviates from a target geometry of the at least one of the brush head, the brush body (6), or the brush handle.

7. The method as claimed in claim 1, further comprising:
capturing at least one image of one said brush (2) to be checked and classifying the brush (2) by the classifier (4) as a defective or intact brush (2) based on features of the brush (2) extracted from the image.

8. The method as claimed in claim 1, further comprising:
outputting a result of the classification carried out by the classifier (4) as a test result by an output unit (9) of a checking apparatus (3).

9. The method as claimed in claim 1, further comprising:
the images of the training data set showing the defective brushes (2) in at least one defined view, and
capturing images of the brushes (2) to be checked in a same view as the view in which the images of the training data set show the defective brushes (2).

10. The method as claimed in claim 1, further comprising
playing back a confirmation or a correction of the classification carried out by the classifier (4) to the classifier (4) by at least one of a human-machine interface (10) or a trained feedback classifier.

11. The method as claimed in claim 1, wherein the classifier comprises an AI-based classifier configured for at least one of machine learning or deep learning.

12. A checking apparatus (3) comprising:
a controller configured to carry out steps of the method as claimed in claim 1 to quality check brushes (2),
wherein the controller is configured to control at least one of
- a classifier (4) for brushes (2),
- a brush making machine (1) that makes brushes (2) to be classified,
- a camera (11) for capturing images of the brushes (2) stored in a training data set,
- a rotary apparatus (12) configured for rotating the brushes (2) during capture, or
- a database (15) in which a training data set is stored.

13. The checking apparatus (3) as claimed in claim 12, further comprising:
at least one camera (11) configured to capture images of the brushes (2) to be checked,
at least one output unit (9) configured to indicate a result of the checking,
at least one rotary apparatus (12) configured for rotating the brushes (2) during capture, and
at least one database (15) connected to the controller (14) in which database a training data is stored,
wherein the at least one camera and the at least one rotary apparatus produce the various images of the brushes (2) to be checked,
wherein the images of the brushes (2) are checked against the training data stored in the at least one database,
wherein the checked images produce at least one output unit (9).

14. A brush making machine (1) comprising:
a checking apparatus (3) as claimed in claim 13,
wherein the brush making machine makes brushes (2) suitable for the checking apparatus (3) to check.

15. A production network (16) comprising:
at least two of the brush making machines (1) as claimed in claim 14, wherein the brush making machines (1) are wirelessly connected to one another at least temporarily by a data.

16. The method as claimed in claim 1, wherein the classifier (4) is configured to classify brushes (2) to be checked as at least one of intact brushes or as defective brushes based on the images of the brushes (2).

17. The method as claimed in claim 1, further comprising:
extracting features which represent intact brushes (2) from the training data set.

18. The method of claim 6, wherein the defect comprises:
at least one of
- a dent,
- depression,
- instance of damage,
- a surface quality that deviates from a target surface quality,
- a deformation,
- a bend, or
- a coloring that deviates from a target coloring.

19. The method according to claim 1, further comprising
capturing images of each said brush (2) from at least two different viewing angles, and rotating the brushes (2) using a rotary apparatus (12) for capturing the images.

* * * * *